US009348884B2

(12) United States Patent
Chen et al.

(10) Patent No.: US 9,348,884 B2
(45) Date of Patent: May 24, 2016

(54) METHODS AND APPARATUS FOR REUSE OPTIMIZATION OF A DATA STORAGE PROCESS USING AN ORDERED STRUCTURE

(75) Inventors: Ying Chen, San Jose, CA (US); Bin He, San Jose, CA (US); Ana Lelescu, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 536 days.

(21) Appl. No.: 12/128,264

(22) Filed: May 28, 2008

(65) Prior Publication Data
US 2009/0300038 A1    Dec. 3, 2009

(51) Int. Cl.
*G06F 17/30*    (2006.01)

(52) U.S. Cl.
CPC .... *G06F 17/30592* (2013.01); *G06F 17/30563* (2013.01); *G06F 17/30569* (2013.01)

(58) Field of Classification Search
CPC ............... G06F 17/30592; G06F 17/30563
USPC ................. 707/999.101, 999.102, 999.104, 707/999.105, 999.106, 999.107
See application file for complete search history.

(56) References Cited

U.S. PATENT DOCUMENTS

| 7,010,538 | B1 | 3/2006 | Black |
| 7,280,998 | B1 | 10/2007 | Aboujaoude et al. |
| 7,778,972 | B1* | 8/2010 | Cormie et al. ............... 707/626 |
| 2003/0236677 | A1 | 12/2003 | Casati et al. |
| 2004/0098436 | A1* | 5/2004 | Futa et al. ..................... 708/492 |
| 2004/0260696 | A1 | 12/2004 | Matsuoka et al. |
| 2005/0071842 | A1 | 3/2005 | Shastry |
| 2005/0125775 | A1 | 6/2005 | Fujikura |
| 2005/0192986 | A1* | 9/2005 | Butler ........................... 707/100 |
| 2005/0198044 | A1* | 9/2005 | Kato et al. ..................... 707/100 |
| 2005/0267902 | A1* | 12/2005 | Thurnhofer et al. ........... 707/100 |
| 2006/0115017 | A1* | 6/2006 | Ordentlich et al. ............ 375/316 |
| 2006/0218405 | A1 | 9/2006 | Ama et al. |
| 2007/0005624 | A1* | 1/2007 | Wu et al. ....................... 707/101 |
| 2007/0016615 | A1* | 1/2007 | Mohan et al. ............... 707/104.1 |
| 2007/0174278 | A1* | 7/2007 | Ramesh et al. .................... 707/7 |
| 2008/0091910 | A1* | 4/2008 | Yoshida et al. ................ 711/170 |

(Continued)

OTHER PUBLICATIONS

Hasse Diagram,http://en.wikipedia.org/wiki/Hasse_diagram, 4 pages.
http://mathworld.wolfram.com/HasseDiagram.html, 1 page.

(Continued)

*Primary Examiner* — Mohammad S Rostami
(74) *Attorney, Agent, or Firm* — Daniel E. Johnson; Ryan, Mason & Lewis, LLP

(57) ABSTRACT

Techniques for reducing a number of computations in a data storage process are provided. One or more computational elements are identified in the data storage process. An ordered structure of one or more nodes is generated using the one or more computational elements. Each of the one or more nodes represents one or more computational elements. Further, a weight is assigned to each of the one or more nodes. An ordered structure of one or more reusable nodes is generated by deleting one or more nodes in accordance with the assigned weights. The ordered structure of one or more reusable nodes is utilized to reduce the number of computations in the data storage process. The data storage process converts data from a first format into a second format, and stores the data in the second format on a computer readable medium for data analysis purposes.

22 Claims, 3 Drawing Sheets

(56) References Cited

U.S. PATENT DOCUMENTS

| | | | |
|---|---|---|---|
| 2008/0126397 A1* | 5/2008 | Alexander et al. | 707/102 |
| 2008/0147673 A1* | 6/2008 | Candea et al. | 707/10 |
| 2008/0270549 A1* | 10/2008 | Chellapilla et al. | 709/206 |
| 2008/0270626 A1* | 10/2008 | Takeda et al. | 709/238 |
| 2008/0313196 A1* | 12/2008 | Furusho | 707/100 |
| 2009/0116406 A1* | 5/2009 | Suzuki et al. | 370/254 |
| 2009/0182723 A1* | 7/2009 | Shnitko et al. | 707/5 |

OTHER PUBLICATIONS

P. Vassiliadis et al., "A Generic and Customizable Framework for the Design of ETL Scenarios," Information Systems, Nov. 2005, pp. 492-525, vol. 30, No. 7.

U.S. Appl. No. 11/847,035 filed in the name of B. Halberstadt et al. on Aug. 29, 2007 and entitled "Data Lineage in Data Warehousing Environments."

\* cited by examiner

600

METHODS AND APPARATUS FOR REUSE OPTIMIZATION OF A DATA STORAGE PROCESS USING AN ORDERED STRUCTURE

FIELD OF THE INVENTION

The present invention generally relates to data storage processing and, more particularly, to techniques for optimizing a data storage process using an ordered structure of nodes, in which the nodes represent computational elements of the data storage process.

BACKGROUND OF THE INVENTION

Enterprises are building significantly sizable data warehouses to enable analytics as a way to unlock the power of information and improve business performance. One method of building data warehouses is to utilize a data storage process, like an Extract, Transform, and Load (ETL) process. In ETL processing, data are typically extracted from a source format and transformed into a desired target format. The transformed data are then loaded into a database or data warehouse for analysis purposes. In practice, the extraction and transformation of the source data may involve complicated computations that are composed of multiple smaller computational steps. Depending on the amount of data to be processed, data storage processing can be time consuming and expensive. For example, in order to handle an increase in the amount of data to be processed, data processing enterprises are forced to purchase faster computers to satisfy their computational needs. A more cost efficient solution would be to optimize the way in which we process and store data.

Conventional ETL technologies, which process unstructured and semi-structured data such as XML, are inefficient in processing data. In particular, many ETL processes are unnecessarily repetitive. For example, it is not uncommon to see an ETL process that repeatedly extracts and transforms the same data in a document when loading a target data warehouse. These repetitive steps waste valuable computational resources and needlessly lengthen the overall ETL process. In the end, data storage processors are spending time and money on unneeded computations.

SUMMARY OF THE INVENTION

Principles of the present invention provide techniques that overcome the above-mentioned drawbacks associated with existing methods by providing techniques that address the above needs, as well as other needs. Particularly, principles of the invention provide techniques for reducing a number of computations in a data storage process. Reducing the number of computations in a data storage process is beneficial to data processors/analysts because it dramatically reduces the amount of time, money, and resources spent on unneeded computations.

For example, in one embodiment of the invention, a technique for reducing a number of computations in a data storage process comprises a computer performing the following steps. One or more computational elements are identified in the data storage process. An ordered structure of one or more nodes is generated using the one or more computational elements. Each of the one or more nodes represents one or more computational elements. Further, a weight is assigned to each of the one or more nodes. An ordered structure of one or more reusable nodes is generated by deleting one or more nodes in accordance with the assigned weights. The ordered structure of one or more reusable nodes is utilized to reduce the number of computations in the data storage process. The data storage process converts data from a first format into a second format, and stores the data in the second format on a computer readable medium for data analysis purposes.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
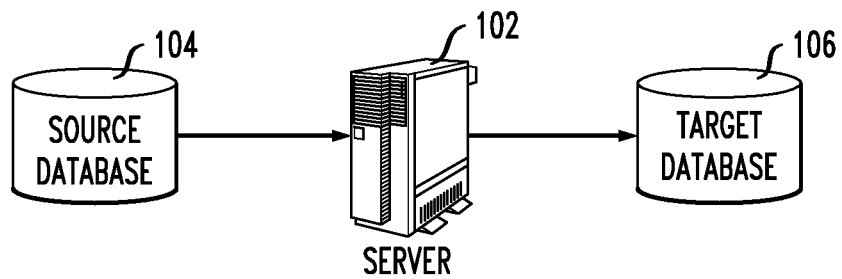
FIG. 1 is a diagram illustrating one general implementation for employing the proposed techniques, according to an embodiment of the present invention.

The present invention will be described in conjunction with exemplary methods for reducing a number of computations in a data storage process. Specifically, the present disclosure will illustrate optimizing the extraction and transformation steps in an ETL process (e.g., a data storage process) using a weighted Hasse diagram (e.g., an ordered structure). It should be understood, however, that the invention is not limited to the particular embodiments described herein. The principles of this invention are generally applicable to any data storage process optimized through the use of any type of ordered structure, and modifications to the illustrative embodiments will become apparent to those skilled in the art given the teachings described herein.

The term "data storage process" as used herein is intended to be construed broadly so as to encompass, by way of example and without limitation, any methodology for storing data. A data storage process may comprise, but is not limited to, converting data from one format into a second format, and storing the converted data. For example, keyword data extracted from raw medical data may be stored as organized data on a medical database. Or, terms extracted from a patent database may be loaded on to a patent search engine index.

The term "computational elements" as used herein is intended to be construed broadly so as to encompass, by way of example and without limitation, any step or component of a process or procedure. Computational elements may include, but are not limited to, values, attributes, and/or functions of an algorithm.

The term "ordered structure" as used herein is intended to be construed broadly so as to encompass, by way of example and without limitation, any organized framework of ordered elements. One example of an ordered structure is a Hasse diagram.

In this disclosure, we describe a mechanism which capitalizes on the following observation common in data storage processing. In many cases, the complicated computations for extractions and transformations are composed from the same or similar sets of smaller computational units, or functions. If one can dynamically and intelligently identify common individual functions and save the intermediate results of these functions for reuse, the performance of a data storage process can be significantly improved because repetitive results do not have to be re-computed (e.g., the total number of computations in the data storage process is reduced).

We present an algorithm to automatically find the optimal reuse strategy for a data storage process, given a set of extraction and transformation actions between a source data set and a target data set. In an illustrative embodiment, a Hasse diagram with an intelligent system of weights is utilized to help identify reusable results from the extraction and transformation functions. With such an approach, the data exchange and data storage process can be automatically optimized. This approach significantly improves processing performance.

The following example illustrates a repeated-call problem in the extraction step of a data storage process (e.g., ETL process):

```
create DIMENSION OPEN_DATE FIELDS (
    ec_date from "./CC_OPEN_DATE/text( )" type
VARCHAR  10 show as structure with index in DB,
    month from "./CC_OPEN_DATE/text( )" function SplitSelect(?, "-",
2) type int show as structure with index in DB,
    day from "./CC_OPEN_DATE/text( )" function SplitSelect(?, "-", 3)
type int show as structure with index in DB,
    year from "./CC_OPEN_DATE/text( )" function SplitSelect(?, "-", 1)
type int show as structure with index in DB)
    MODEL USING SNOWFLAKE;
```

The above statement defines a dimension in a target data warehouse, called "OPEN_DATE". It contains four fields, ec_date, month, day, and year. The four fields are populated from data with the XML tag "./CC_OPEN_DATE/text( )" contained in a source XML file. In this example, the source XML data are in the following format: "<CC_OPEN_DATE>07-10-22</CC_OPEN_DATE>". SplitSelect(?, "-", #) indicates that the extraction should be carried out on a specific part of the string separated by "-". Clearly, the extraction function "./CC_OPEN_DATE/text( )" is the same for all four fields. In a naïve and inefficient ETL process, the system would compute the same function four times, one for each field extraction. A smarter algorithm would only compute the extraction function once and reuse the result from "./CC_OPEN_DATE/text( )" for the other fields.

The next example shows a similar problem occurring during a transformation step:

```
create DIMENSION ANNOTATION_POS FIELDS (
    TOKENS from "./ASZPRPT_PROBLEMS_DESCRIPTION/text( )"
function SplitSelect(UIMAAnnotator(?1), "_", 2) type VARCHAR 1000
show as structure with index in DB,
    POS  from  "./ASZPRPT_PROBLEMS_DESCRIPTION/text( )"
function SplitSelect(UIMAAnnotator(?1),"_",3) type VARCHAR 1000
show as structure with index in DB)
    MODEL USING SNOWFLAKE;
```

The above statement defines a dimension in a target data warehouse, called "ANNOTATION_POS". It contains two fields, TOKENS and POS. The two fields are populated from data in the source XML file with the XML tag "./ASZPRPT_PROBLEMS_DESCRIPTION/text()". An intermediate string is constructed via a transformation function called UIMAAnnotator(?1). It essentially uses "./ASZPRPT_PROBLEMS_DESCRIPTION/text( )" as the input and generates an annotated result as a string output. Clearly, the extraction function "./ASZPRPT_PROBLEMS_DESCRIPTION/text( )" and the transformation function UIMAAnnotator(?1) are the same for both fields. An inefficient ETL process would repeat both functions twice, once for each field. A smarter algorithm would reuse the intermediate result from "./ASZPRPT_PROBLEMS_DESCRIPTION/text( )" and UIMAAnnotator(?1).

Clearly, finding reuse opportunities and enabling reuse would be extremely beneficial, especially when handling large volumes of data. A reuse optimization can be formally defined as follows. Suppose that an attribute A in the target schema is generated by some transformation or extraction function, $f(p_1, \ldots, p_m)$, that operates on top of a set of attributes, $(A_1, A_2, \ldots, A_n)$, from the source data (e.g., data in relational or XML formats). Here, $p_x$ can be $A_y$, or a constant value or another function. Identifying optimal reuse possibilities and eliminating reuse implies that the following two conditions are satisfied: (1) all possible reuse situations are identified; and (2) any saved intermediate results should be reused at least once.

Referring initially to FIG. 1, a diagram illustrates one general implementation for employing the proposed techniques, according to an embodiment of the present invention. The process of reducing the number of computations in a data storage process (e.g., reuse optimization) may be carried out on any computer based system. In an illustrative embodiment, a server 102 carrying out a data storage process, extracts and transforms data from a storage location, or a source database 104, and loads the transformed data into a data warehouse, or target database 106. The techniques for identifying reuse situations and saving intermediate results for reuse may occur concurrently with the data storage process within the server 102. It is to be appreciated that the server 102 may obtain data from more than one data source. Further, the server 102 may load the extracted and transformed data on to multiple target databases or storage locations.

Figure 2:
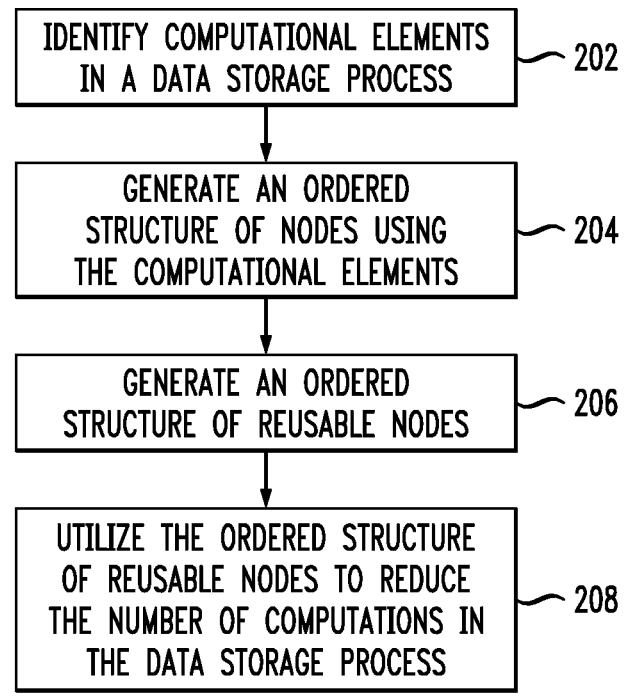
FIG. 2 is a flow diagram illustrating a methodology for reducing a number of computations in a data storage process, according to an embodiment of the present invention.

Referring now to FIG. 2, a flow diagram illustrates a methodology for reducing a number of computations in a data storage process, according to an embodiment of the present invention. Methodology 200 begins at step 202 where computational elements in a data storage process are identified. As illustrated in the example above, a computational element may be an attribute or a function of a data storage process. At step 204, an ordered structure of nodes is generated using the computational elements. In an exemplary embodiment, the ordered structure is a Hasse diagram (see FIGS. 3-5). The nodes of the ordered structure represent the computational elements of the data storage process. For example, function $f_1(x, y)$, where x and y are attributes, will result in an ordered structure with three nodes: $f_1$, x, and y.

A weight is also assigned to each node. In an exemplary embodiment, a weight of a node is equal to a number of times a given computational element is used in the data storage process. Using the previous example, if function $f_1$ is used three times, node $f_1$ will have a weight of three. If attribute x is used two times, then node x will have a weight of two, etc.

In one embodiment, a hash table is generated to keep track of the nodes of the ordered structure. Each node in the hash table comprises a unique identifier, which represents a specific computational element. Before a computational element is added to the ordered structure, it is compared to the unique identifiers of the hash table. If the computational element is new, a new identifier is created and a new node with the new identifier is added to the hash table. However, if the computational element already exists in the hash table, the weight of that node is increased by one. This prevents repeated generation of a node in the ordered structure. It should be noted that an attribute $A_1$ is equal to an attribute $A_2$ if they both refer to the same attribute in the source schema (e.g., equality of attributes). Or, a function $f_1(p_1, \ldots, p_m)$ is equal to a function $f_2(q_1, \ldots, q_n)$, if $f_1 = f_2$, m=n, and $p_i$ is equal to $q_i$ (e.g., equality of functions).

After the ordered structure of nodes is generated, nodes are deleted (e.g., via a pruning strategy) (step 206). Nodes are deleted according to weight. In an exemplary embodiment, a node is deleted if its weight is equal to one. A weight of one means that the computational element that the node represents only occurs once, therefore, it can not be a candidate for reuse. A node is also deleted if its weight is equal to a parent node. It should be noted that ordered structures illustrate relationships between nodes (e.g., parent and child relationships). In the example of function $f_1(x, y)$, $f_1$ is a parent of x and y, because x and y are contained within function $f_1$. If $f_1$ has a weight of two (e.g., $f_1(x, y)$ occurs twice), x has a weight of two (e.g., x occurs twice), and y has a weight of two (e.g., y occurs twice), there is no need to reuse all three attributes/functions. Rather, only the intermediate value returned for function $f_1(x, y)$ needs to be saved for reuse because it encompasses the two uses of x and y. The deletion of nodes will be illustrated in greater detail below with reference to FIGS. 3-5.

The deletion of nodes, which occurs during step 206, results in the generation of an ordered structure of reusable nodes. At step 208, the ordered structure of reusable nodes is utilized to reduce the number of computations in the data storage process. As prefaced above, this is done by saving the intermediate values of the computational elements identified in the ordered structure of reusable nodes. The saved intermediate values are then used in place of full computations during the data storage process. This reduces the number of computations required by the process and increases speed and efficiency.

The steps of methodology 200 will now be illustrated in greater detail with reference to the examples of FIGS. 3-5. In general, ETL processing may involve many extraction and transformation functions, and combinations thereof. Without care, the reuse computation may be suboptimal and hence performance may not be scalable. The following examples illustrate three data storage processes where reuse optimization may be applicable.

Example 1: two target attributes B and C are generated from the source attributes $A_1$ and $A_2$ using the following functions respectively:

$B \leftarrow f_1(f_2(A_1, A_2))$ $C \leftarrow f_3(f_2(A_1, A_2))$

B and C both use $A_1$ and $A_2$ as inputs, so the extractions for $A_1$ and $A_2$ together can be used when deriving B and C. Similarly, $f_2$ may be reused since it applies the same inputs on the same function. But, it is not necessary to reuse $A_1$ or $A_2$ individually since there is no reuse opportunity for utilizing $A_1$ or $A_2$ extractions alone.

Example 2: B, C, and D are three target attributes derived from three sets of functions:

$B \leftarrow f_1(f_2(A_1, A_2))$ $C \leftarrow f_1(f_2(A_1, A_2))$ $D \leftarrow f_4(A_1)$ Since $A_1$ and $A_2$ are used multiple times, and $A_1$ is used both individually and together with $A_2$, extractions for $A_1$ and $A_2$ together and $A_1$ individually may be reused. Similarly, transformations $f_1$ and $f_2$ may be reused since the inputs are the same for both functions. However, note that it is not necessary for one to reuse function $f_2$ as long as the final result for $f_1(f_2(A_1, A_2))$ is saved. Therefore, the reuse of $f_2$ in this case is unnecessary. Similarly, since $A_2$ is never used alone, there is no need to save the extraction of $A_2$.

Example 3: B, C, and D are generated from the following functions and inputs:

$B \leftarrow f_1(f_2(A_1, A_2), f_2(A_1, A_2), f_5(A_2))$ $C \leftarrow f_1(f_2(A_1, A_2), f_2(A_1, A_2), f_5(A_2))$ $D \leftarrow f_4(A_1)$ Since $A_1$ and $A_2$ are used both individually as well as together, both individual extractions of $A_1$ and $A_2$, as well as the extraction of $A_1$ and $A_2$ together may be reused. Similarly, the value returned for function $f_2$ may be reused to compute B (e.g., $f_2$ is used twice in B). Further, the result of function $f_1$ for B may be reused when computing C.

In one embodiment, when computing optimal reuse and eliminating repeated calls, we analyze functional extractions and transformations using a leveraged and expanded Hasse diagram expression, which is typically used in performing partial ordering on a set of given entities. For a discussion of a Hasse diagram, see the website given by the concatenation of "http://" and "mathworld.wolfram.com/HasseDiagram.html." Hasse diagrams are well known to those having ordinary skill in the art. A Hasse diagram is a graphical rendering of a partially ordered set of data displayed via the cover relation of the partially ordered set with an implied upward orientation. In one embodiment, a Hasse diagram represents elements to be ordered via a connected graph.

In an exemplary embodiment, we identify reuse opportunities and execute reuse by constructing a Hasse diagram using the following steps. Equivalent to steps 202 and 204 of methodology 200, we first represent the extraction and transformation functions and input attributes using a lattice Hasse diagram (e.g., ordered structure). We represent functions and input attributes as nodes in the structure, and the relationships among them as edges. Each edge has a parent-child relationship where the child nodes are the inputs to a function, and the function is the parent node. We extend the traditional Hasse diagram with some weights assigned to each node. Each weight value represents the number of times a node is used for computing the target attributes.

Figure 3:
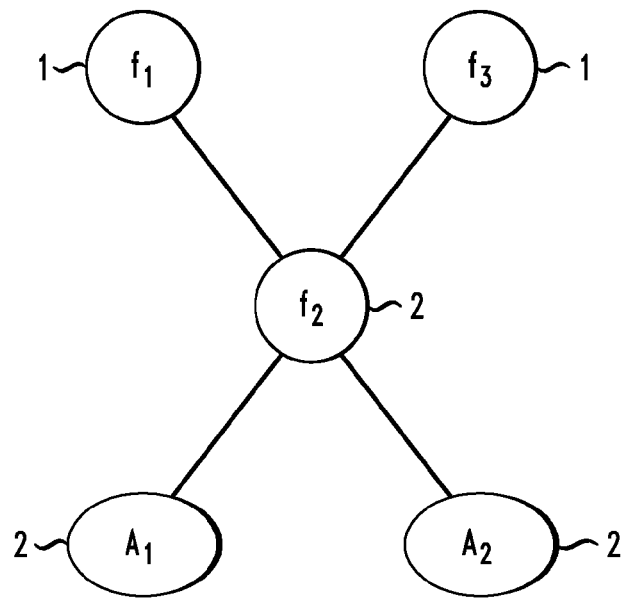
FIG. 3 is a diagram illustrating a first example of target attribute computations represented as an ordered structure, according to an embodiment of the present invention.

Referring now to FIG. 3, a diagram illustrates a first example of target attribute computations represented as an ordered structure, according to an embodiment of the present invention. FIG. 3 shows the lattice weighted Hasse diagram representing Example 1

$B \leftarrow f_1(f_2(A_1, A_2))$ $C \leftarrow f_3(f_2(A_1, A_2))$

In this diagram, nodes represent either input extracted attributes, i.e., $A_1$ and $A_2$, or transformation functions, i.e., $f_1$, $f_2$, and $f_3$. Edges are used to connect inputs of the functions to the function nodes themselves. For instance, $A_1$ and $A_2$ are inputs to function $f_2$, so they both are connected to $f_2$. $A_1$ and $A_2$ are both used twice. Further, function $f_2$ is also used twice. Therefore, nodes $A_1$, $A_2$, and $f_2$ all have weights of two. Functions $f_1$ and $f_3$ are only used once, so their weights are one.

In an exemplary embodiment, nodes with a weight of one and nodes with a weight equal to a parent node are deleted. This results in an ordered structure of reusable nodes as in step 206 of methodology 200. In this example, nodes $f_1$ and $f_3$ are eliminated because their weights are one (e.g., they are only used once and are not reused). Further, $A_1$ and $A_2$ are deleted because they (e.g., child nodes) have a weight equal to the parent node, function $f_2$. Therefore, only $f_2$ is a candidate for reuse. Equivalent to step 208 of methodology 200, the intermediate value returned from $f_2(A_1, A_2)$ is saved and utilized in the computation of C.

Figure 4:
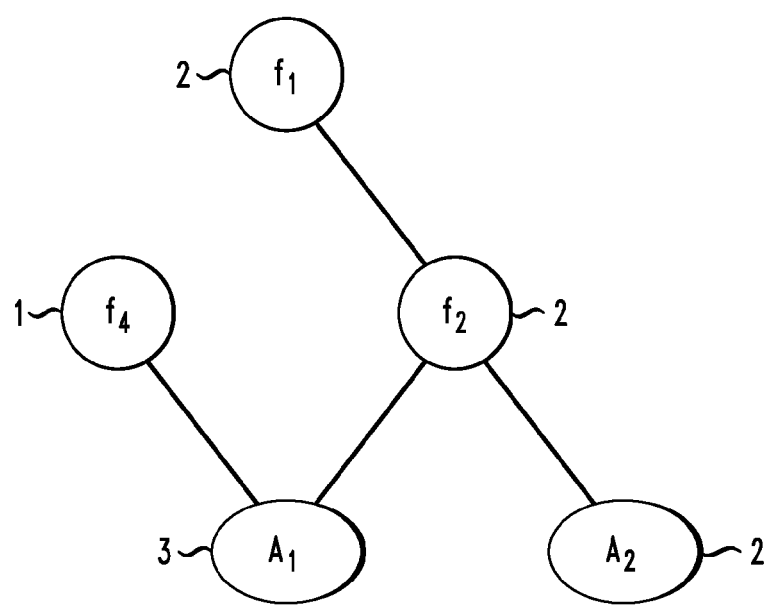
FIG. 4 is diagram illustrating a second example of target attribute computations represented as an ordered structure, according to an embodiment of the present invention.

Referring now to FIG. 4, a diagram illustrates a second example of target attribute computations represented as an ordered structure, according to an embodiment of the present invention. FIG. 4 shows a graphical illustration of Example 2:

$$B \leftarrow f_1(f_2(A_1, A_2))$$

$$C \leftarrow f_1(f_2(A_1, A_2))$$

$$D \leftarrow f_4(A_1)$$

$A_1$ and $A_2$ are the input attributes, and $f_1$, $f_2$, and $f_4$ are transformations. $A_1$ is used three times, while $A_2$ is used twice. Further, functions $f_1$ and $f_2$ are used twice, and $f_4$ is only used once.

When generating the ordered structure of reusable nodes, node $f_4$ is eliminated because it has a weight of one. Further, node $A_2$ is deleted because it has a weight equal to parent node $f_2$. In addition, node $f_2$ is deleted because it has a weight equal to its parent $f_1$. In this example, $f_1$ is an ideal candidate for reuse because it can be used to compute C. The call for attribute $A_1$ may also be reused since it is used once in the computation of B and once in the computation of D. It should be noted that $A_1$ may not be used in the computation of C if the value of $f_1$ is saved and reused.

Figure 5:
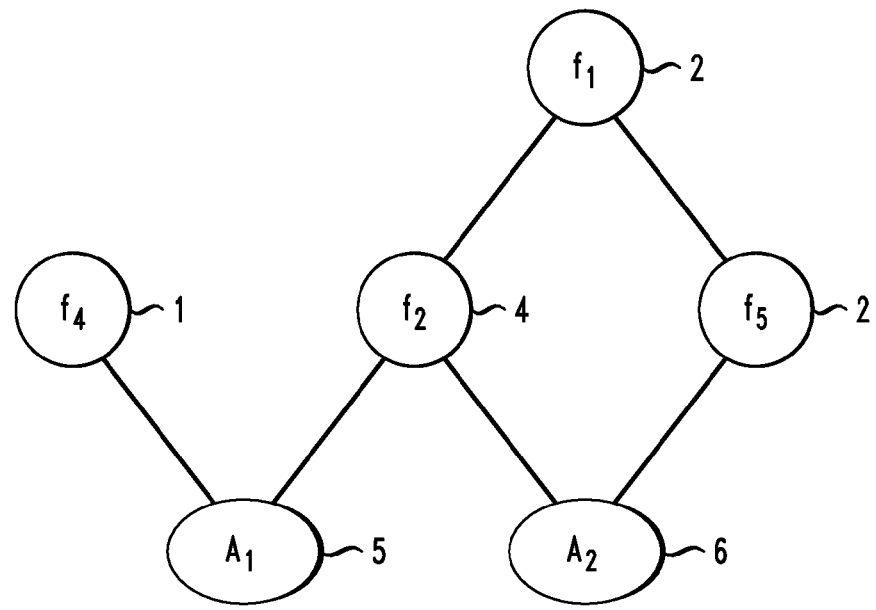
FIG. 5 is a diagram illustrating a third example of target attribute computations represented as an ordered structure, according to an embodiment of the present invention.

Referring now to FIG. 5, a diagram illustrates a third example of target attribute computations represented as an ordered structure, according to an embodiment of the present invention. FIG. 5 shows the Hasse diagram of Example 3:

$$B \leftarrow f_1(f_2(A_1, A_2), f_2(A_1, A_2), f_5(A_2))$$

$$C \leftarrow f_1(f_2(A_1, A_2), f_2(A_1, A_2), f_5(A_2))$$

$$D \leftarrow f_4(A_1)$$

The ordered structure indicates that $A_1$ and $A_2$ are used five and six times, respectively. Further, function $f_2$ is used four times, functions $f_1$ and $f_5$ are used twice, and function $f_4$ is used only once.

When generating the ordered structure of reusable nodes, node $f_4$ is not a candidate for reuse because it has a weight of one. Further, node $f_5$ is eliminated for reuse because it has a weight equal to parent node $f_1$. In this example, $f_1$ is a good candidate for reuse because it may be used to compute C. It should be noted that $f_2$ may be used for reuse because it is used twice in the computation of B; however, $f_2$ may not be used in the computation of C because only the value of $f_1$ is needed.

In light of the above examples, a preferred algorithm for reuse optimization may be summarized in the following four steps. First, construct the weighted Hasse diagram for all extraction and transformation elements involved in the ETL process. Since all extractions and transformation are typically defined in some configuration file or by some high level language, one can easily parse the configuration files or the language to identify the extraction and transformation elements for a given ETL process. An ETL process is defined as transforming a given set of source attributes into a set of target attributes by applying sets of transformation and extraction functions.

Next, delete all nodes with a weight of one. These nodes are only used once; therefore, they are not candidates for reuse. Further, delete all nodes whose weights are equal to their parents' weights. If a child node has the same weight as a parent node, only the parent needs to be reused. For example, in FIG. 5, $f_5$ and $f_1$ each has a weight of two, and $f_1$ is the parent. Therefore, there is no need to save $f_5$ for reuse even though it is used twice based on the original transformation expression. Similarly, in FIG. 4, both $A_2$ and $f_2$ need not be reused, since the result of $f_1$ can be reused. Once these steps are completed, the remaining nodes are the reusable nodes.

Note that when constructing the initial, weighted ordered structure, one should assign weights to nodes accordingly. This is done by comparing if a given input attribute or function is the same as an existing node. If a node already exists for a given attribute or function, the weight of the node should be increased by one. Otherwise, a new node should be added to the ordered structure. In an exemplary embodiment, we compute a unique signature for each unique input attribute or function and save them in a hash table. The hash table is then used to facilitate efficient node to attribute/function comparisons. For example, as the ordered structure with weights is generated, a signature is computed for each new input attribute or function. If a computed signature element already exists in the hash table, the weight of the matching element is increased. Otherwise, a new node is created.

During run time of the data storage process, a system utilizes the ordered structure of reusable nodes (e.g., a final pruned structure) described above to implement reuse (e.g., reduce the number of computations in the data storage process). In an exemplary embodiment, reuse may be carried out in accordance with the following algorithm. Given an attribute B with its corresponding extraction and transformation nodes, call function ComputeValue(Root node of B):

```
ComputeValue(node) {
    If the node is reusable (as indicated by the ordered structure of
    reusable nodes) AND an intermediate result is available {
        Use the intermediate result directly and return
    }
    Else {
        If it is an extraction node → extract the data
        If it is a transformation function node → compute the
        function. For a nested function, recursively call the
        ComputeValue function
    }
    If the node is reusable AND the intermediate result is not available
    (e.g., this is the first time computing the function) {
        Save the intermediate result
    }
}
```

Figure 6:
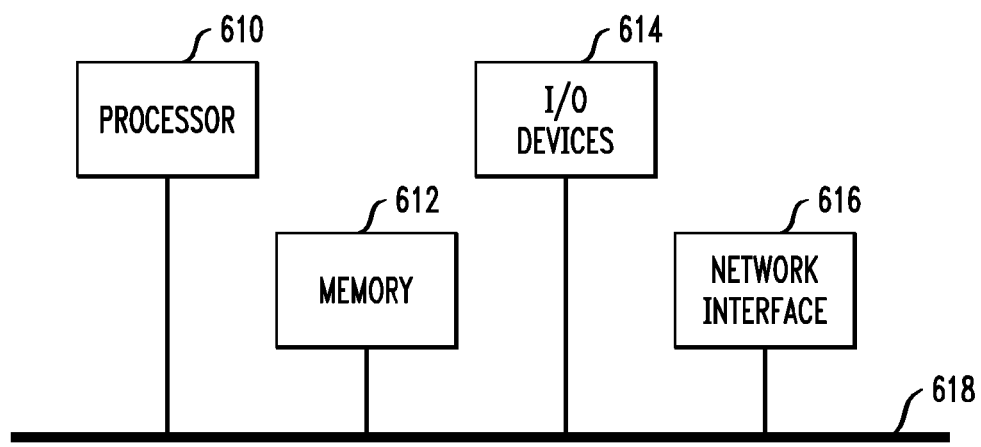
FIG. 6 is a diagram illustrating an illustrative hardware implementation of a computing system in accordance with which one or more components/methodologies of the present invention may be implemented, according to an embodiment of the present invention.

Referring now to FIG. 6, block diagram 600 illustrates an exemplary hardware implementation of a computing system in accordance with which one or more components/methodologies of the invention (e.g., components/methodologies described in the context of FIGS. 1-5) may be implemented, according to an embodiment of the present invention.

As shown, the techniques for reducing a number of computations in a data storage process may be implemented in accordance with a processor 610, a memory 612, I/O devices 614, and a network interface 616, coupled via a computer bus 618 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, or a magnetic storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Further, the present invention was described above with reference to diagrams of methods, apparatus (systems), and computer program products according to embodiments of the invention. It will be understood that individual functions/acts in the diagrams, and combinations of functions/acts in the diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the diagrams.

These computer program instructions may also be stored in a computer-readable medium that may direct a computer or other programmable data processing apparatus to function in a particular manner, such that the instructions stored in the computer-readable medium produce an article of manufacture including instruction means which implement the functions/acts specified in the diagrams.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the diagrams.

The diagrams illustrate the architecture, functionality, and operation of possible implementations of systems, methods, and computer program products according to various embodiments of the present invention. In this regard, individual functions/acts in the diagrams may represent a module, segment, or portion of code, which comprises one or more executable instructions for implementing the specified logical function(s). It should also be noted that, in some alternative implementations, the functions/acts in the diagrams may occur out of the order noted in the diagrams. For example, two steps shown in succession may, in fact, be executed substantially concurrently, or the steps may sometimes be executed in the reverse order, depending upon the functionality involved. It will also be noted that individual functions/acts in the diagrams, and combinations of functions/acts in the diagrams, may be implemented by special purpose hardware-based systems that perform the specified functions or acts, or combinations of special purpose hardware and computer instructions.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
   accessing, by a computer server, data from a source database; and
   executing, by the computer server, a data storage process to store the accessed data in a target database;
   wherein the computer server is configured to minimize a total number of computations in the data storage process by identifying at least one function that is commonly implemented in multiple steps of the data storage process and saving intermediate processing results of the at least one function for reuse in the data storage process;

wherein the computer server is configured to minimize the total number of computations in the data storage process by a method comprising:

identifying one or more computational elements in the data storage process, wherein the computational elements comprise functions of a process for storing data, wherein the functions comprises functions that are used to implement data extraction functions and data transformation functions;

generating a first ordered structure of one or more nodes using the one or more identified computational elements, wherein each node of the one or more nodes of said first ordered structure corresponds to at least one of said identified computational elements;

assigning a weight to each of the one or more nodes of said first ordered structure, wherein the weight of a given node is assigned based on a number of times the corresponding computational element is used in the data storage process;

deleting one or more nodes of said first ordered structure based on the assigned weights of the nodes, to generate a second ordered structure of one or more reusable nodes; and utilizing the second ordered structure of one or more reusable nodes to reduce the number of computations in the data storage process by (i) saving intermediate results of the computational elements corresponding to the one or more reusable nodes of said second ordered structure, and (ii) utilizing the saved intermediate results during the data storage process instead of re-executing the functions of the computational elements corresponding to the one or more reusable nodes of the second ordered structure.

2. The method of claim 1, wherein the data storage process comprises an extract, transform, and load (ETL) process.

3. The method of claim 1, wherein the computational elements comprise attributes.

4. The method of claim 1, wherein the first ordered structure comprises a Hasse diagram.

5. The method of claim 1, further comprising generating a hash table comprising the one or more nodes of said first ordered structure, wherein each of the one or more nodes is assigned a unique identifier.

6. The method of claim 5, wherein in generating the first ordered structure of one or more nodes, the hash table is used to prevent repeated generation of one or more nodes.

7. The method of claim 5, wherein the hash table tracks the number of times a given computational element is used in the data storage process.

8. The method of claim 1, wherein deleting one or more nodes of said first ordered structure based on the assigned weights of the nodes comprise deleting a given node when a weight of the given node is at least one of equal to one and equal to a weight of a parent node.

9. The method of claim 1, further comprising computing an intermediate value for each of the one or more computational elements during the data storage process.

10. The method of claim 9, further comprising identifying the intermediate values of the one or more computational elements to be saved as intermediate results.

11. An article of comprising a non-transitory computer readable storage medium comprising program instructions which, when executed by a computer, implement a method comprising:

accessing, by a computer server, data from a source database; and executing, by the computer server, a data storage process to store the accessed data in a target database;

wherein the computer server is configured to minimize a total number of computations in the data storage process by identifying at least one function that is commonly implemented in multiple steps of the data storage process and saving intermediate processing results of the at least one function for reuse in the data storage process;

wherein the computer server is configured to minimize the total number of computations in the data storage process by a method comprising:

identifying one or more computational elements in the data storage process, wherein the computational elements comprise functions of a process for storing data, wherein the functions comprises functions that are used to implement data extraction functions and data transformation functions;

generating a first ordered structure of one or more nodes using the one or more identified computational elements, wherein each node of the one or more nodes of said first ordered structure corresponds to at least one of said identified computational elements;

assigning as weight to each of the one or more nodes of said first ordered structure, wherein the weight of a given node is assigned based on a number of times the corresponding computational element is used in the data storage process;

deleting one or more nodes of said first ordered structure based on the assigned weights of the nodes, to generate as second ordered structure of one or more reusable nodes; and utilizing the second ordered structure of one or more reusable nodes to reduce the number of computations in the data storage process by (i) saving intermediate results of the computational elements corresponding to the one or more reusable nodes of said second ordered structure, and (ii) utilizing the saved intermediate results during the data storage process instead of re-executing the functions of the computational elements corresponding to the one or more reusable nodes of the second ordered structure.

12. The article of manufacture of claim 11, wherein the data storage process comprises an extract, transform, and load (ETL) process.

13. The article of manufacture of claim 11, wherein the computational elements comprise attributes.

14. The article of manufacture of claim 11, wherein the first ordered structure comprises a Hasse diagram.

15. The article of manufacture of claim 11, further comprising generating a hash table comprising the one or more nodes of said first ordered structure, wherein each of the one or more nodes is assigned as unique identifier.

16. The article of manufacture of claim 15, wherein in generating the first ordered structure of one or more nodes, the hash table is used to prevent repeated generation of one or more nodes.

17. The article of manufacture of claim 15, wherein the hash table tracks the number of times a given computational element is used in the data storage process.

18. The article of manufacture of claim 11, wherein deleting one or more nodes of said first ordered structure based on the assigned weights of the nodes comprises deleting a given node when a weight of the given node is at least one of equal to one and equal to a weight of a parent node.

19. The article of manufacture of claim 11, further comprising computing an intermediate value for each of the one or more computational elements during the data storage process.

20. The article of manufacture of claim 11, further comprising identifying the intermediate values of the one or more computational elements to be saved, as intermediate results.

21. An apparatus comprising:
a memory configured to store program instructions; and
at least one processor coupled to the memory and configured to execute the program instructions to implement a process comprising:
accessing, by a computer server, data from a source database; and
executing, by the computer Server, a data storage process to store the accessed data in a target database;
wherein the computer server is configured to minimize a total number of computations in the data storage process by identifying at least one function that is commonly implemented in multiple steps of the data storage process and saving intermediate processing results of the at least one function for reuse in the data storage process;
wherein the Computer server is configured to Minimize the total number of computations in the data storage process by a method comprising:
identifying one or more computational elements in the data storage process, wherein the computational dements comprise functions of a process fiat storing data, wherein the functions comprises functions that are used to implement data extraction functions and data transformation functions;
generating a first ordered structure of one or more nodes using the one or more identified computational elements, wherein each node of the one or more nodes of said first ordered structure corresponds to at least one of said identified computational elements;
assigning a weight to each of the one or more nodes of said first ordered structure, wherein the weight of a given node is assigned based on a number of times the corresponding computational element is used in the data storage process;
deleting one or more nodes of said first ordered structure based on the assigned weights of the nodes, to generate a second ordered structure of one or more reusable nodes; and
utilizing, the second ordered structure of one or more reusable nodes to reduce the number of computations in the data storage process by (i) saving intermediate results of the computational elements corresponding to the one or more reusable nodes of said second ordered structure, and (ii) utilizing the saved intermediate results during the data storage process instead of re-executing the functions of the computational elements corresponding to the one or more reusable nodes of the second ordered structure.

22. The apparatus of claim 21, wherein deleting one or more nodes of said first ordered structure based on the assigned weights of the nodes comprises deleting to given node when a weight of the given node is at least one of equal to one and equal to a weight of a parent node.

* * * * *